United States Patent [19]
Yoshida

[11] Patent Number: 5,871,207
[45] Date of Patent: Feb. 16, 1999

[54] DAMPER MEANS

[75] Inventor: Takushi Yoshida, Tochigi-ken, Japan

[73] Assignees: Tokyo Seat Co., Ltd., Saitama-Ken; Honda Giken Kogyo Kabushiki Kaisha, Tokyo, both of Japan

[21] Appl. No.: 725,743

[22] Filed: Oct. 4, 1996

[30] Foreign Application Priority Data

Oct. 8, 1995 [JP] Japan ................................. 7-286427

[51] Int. Cl.$^6$ .............................. B60H 3/12; B60R 5/00; A47B 23/00; F16M 1/00
[52] U.S. Cl. ...................... 267/136; 108/44; 224/42.32; 296/37.1; 296/37.14
[58] Field of Search ................................ 267/136, 139, 267/140, 140.2, 140.4, 141.1, 152, 153; 248/632, 634, 636; 108/44; 224/42.32; 296/37.1, 37.3, 37.14

[56] References Cited

U.S. PATENT DOCUMENTS

| | | | |
|---|---|---|---|
| 3,338,626 | 8/1967 | Cauvin | 108/44 |
| 3,460,786 | 8/1969 | Rivin | 248/634 |
| 3,957,127 | 5/1976 | Bouchard et al. | 248/634 |
| 4,296,907 | 10/1981 | Ishida et al. | 248/634 |
| 4,418,898 | 12/1983 | Atsumi et al. | 267/141.1 |
| 5,080,335 | 1/1992 | Solleder et al. | 267/153 |

*Primary Examiner*—Robert J. Oberleitner
*Assistant Examiner*—Chris Schwartz
*Attorney, Agent, or Firm*—Dann, Dorfman, Herrell and Skillman, P.C.

[57] ABSTRACT

A damper device for attachment to a shock-affected component, including a pair of elastic members for absorbing shock which may be applied to the shock-affected component, each of the elastic members taking the form of a block and having first and second sides which are opposite to each other, and a slit formed in the first side and extending into the interior of the elastic member, a support member for supporting the elastic members, the support member having a pair of spaced apart projecting pieces and an intermediate section interconnecting the spaced apart projecting pieces, each of the projecting pieces being formed to have a substantially inverted L-shape in cross-section, the intermediate section being adapted to be mounted on the shock-affected component, the elastic members being adapted to be supported to the support member by causing the elastic members to be fitted on tips of the projecting pieces through slits in the elastic members, and a pair of receiving plates adapted to be mounted on the shock-affected component close to second sides of the elastic members and elastically engaged with the second sides the elastic members and elastically engaged with the second sides of the elastic members, so that where the damper device is attached to the shock-affected component, the elastic members are securely supported to the shock-affected component through the support members and receiving plates without readily detaching from the shock-affected component.

9 Claims, 2 Drawing Sheets

DAMPER MEANS

FIELD OF THE INVENTION

This invention relates to an improvement of damper means which is applied to a shock-affected component, and more particularly to damper means which is applied to, for example, lid means for covering an opening for a storage portion formed in a floor of an automotive vehicle, e.g., a camping or wagon car, for housing any various articles for, e.g., outdoor use.

For clarity of description, damper means which is applied to lid means for covering an opening for a storage portion formed in a floor of an automotive vehicle for housing various articles therein will be referred to in the following.

BACKGROUND OF THE INVENTION

Recently, a camping car or wagon car having a storage portion for housing various articles therein has been proposed. The storage portion is formed in a floor of such a car and has an opening for allowing the various articles to be put in or taken out of the storage portion therethrough. Lid means is removably fitted in the opening in order to cover the opening of the storage portion. Such lid means is generally known as "a cargo floor lid" and is provided with damper means for absorbing any shock which may be applied to the lid means and an edge of the opening of the storage portion.

Referring now to FIG. 1, conventional damper means of this type will be discussed in order to facilitate understanding of the present invention. The damper means includes a pair of block-like elastic members B of rubber for absorbing shock and a support member M attached onto a predetermined portion of a surface of a reverse side of a cargo floor lid L. The support member M includes a pair of projecting pieces P rising upwardly from the surface of the reverse side of the cargo floor lid L. Each of the projecting pieces P is formed to have a substantially inverted L-shape in cross-section. Each of the elastic members B has a slit S formed in one side thereof and extending into the interior of the elastic member. Each of the elastic members B is supported on a corresponding projecting piece P by causing the elastic member B to be fitted on a tip of the projecting piece P through the slit S in the elastic member B.

With the cargo floor lid L provided with the conventional damper means, when the cargo floor lid L is removed from the storage portion and/or is carried by a person, there is a possibility that one or both of the elastic members B will be easily detached from the cargo floor lid L due to elastic force thereof. At that time, there is a possibility that the detached elastic member (or elastic members) B will get lost.

SUMMARY OF THE INVENTION

The present invention has been made to avoid the foregoing disadvantage of the prior art.

Accordingly, it is an object of the present invention to provide damper means for attachment to a shock-affected component, wherein elastic means for absorbing any shock is securely supported to support means in a manner so as not to be detached from the shock-affected component.

It is another object of the present invention to provide damper means as stated above, which is applied to lid means for covering an opening in a storage portion formed in a floor of an automotive vehicle for housing any various articles.

It is still another object of the present invention to provide damper means as stated above, which is simply constructed.

In accordance with the present invention, there is provided damper means for attachment to a shock-affected component. The damper means comprises elastic means for absorbing shock which may be applied to the shock-affected component, the elastic means having first and second sides which are opposite to each other, and slit means formed in the first side of the elastic means and extending into the interior of the elastic means; support means adapted to be mounted on the shock-affected component for supporting the elastic means, the support means including projecting means, the elastic means being supported to the support means by causing the elastic means to be fitted on the projecting means of the support means through the slit means; and receiving means adapted to be mounted on the shock-affected component for receiving the elastic means, the receiving means being adapted to be placed close to the second side of the elastic means and elastically engaged with the second side of the elastic means, so that when the damper means is attached to the shock-affected component, the elastic means can be securely supported to the shock-affected component through the support means and the receiving means without easily detaching from the shock-affected component.

The shock-affected component may comprise lid means for covering an opening in a storage portion formed in a floor of an automotive vehicle. The lid means may comprise a plate-like lid body and a pair of leg members pivotally connected to the plate-like lid body in a manner to be collapsed, whereby the lid means constitutes collapsible table means for outdoor use.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENT

Now, damper means according to the present invention will be discussed hereinafter with reference to the accompanying drawings.

Figure 1:
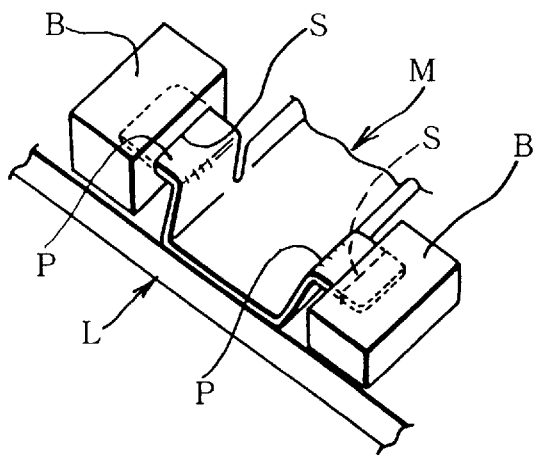
FIG. 1 is a schematic enlarged perspective view of conventional damper means.
Figure 2:
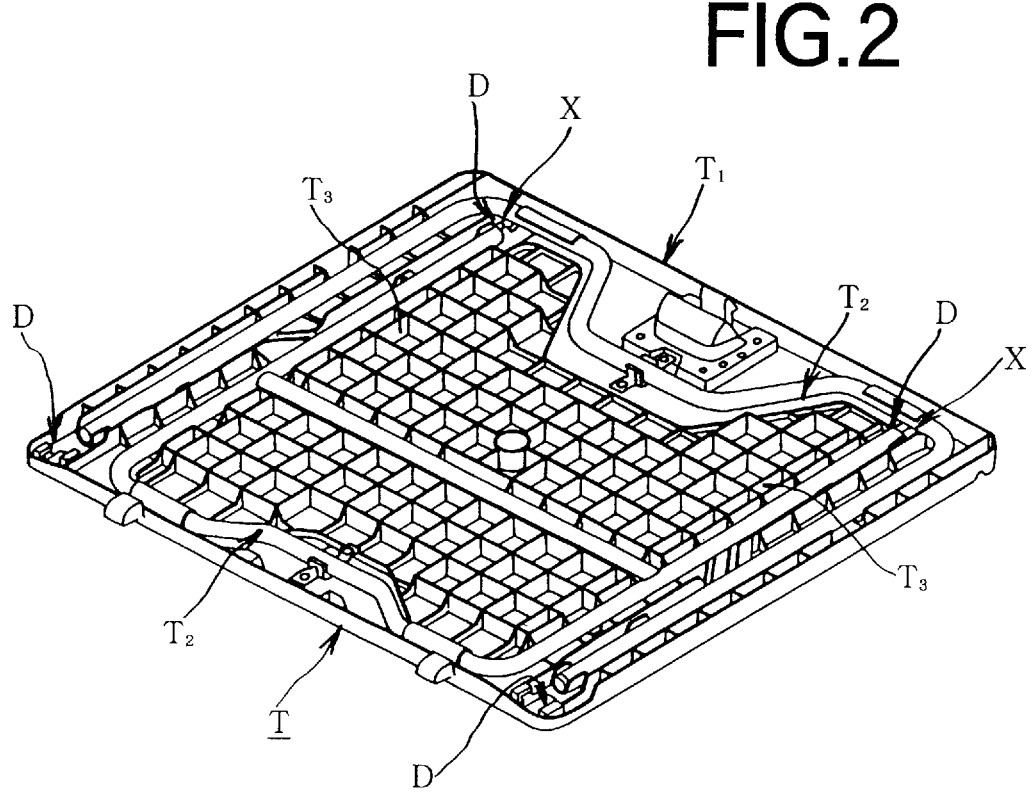
FIG. 2 is a schematic perspective view of a cargo floor lid provided with several damper means of the present invention.

Referring to FIG. 2, there is illustrated a cargo floor lid T provided with several damper means D of the present invention. The cargo floor lid T is adapted to be removably fitted over an opening in a storage portion (not shown) formed in a floor of an automotive vehicle. Various articles can be housed in the storage portion and can be put in and taken out of the storage portion through the opening in the storage portion. In the illustrated example, the cargo floor lid T is adapted to be used both as lid means to cover the opening of the storage portion, and a simple collapsible table means for outdoor use. The cargo floor lid includes a plate-like lid body $T_1$ of a substantially square shape and a pair of leg members $T_2$, each of which is formed to have a substantially M-shape in outline. When the cargo floor lid is used as the table means, the lid body $T_1$ is used as a table on which articles may be placed. The lid body $T_1$ has a plurality of reinforcing ribs $T_3$ formed on a surface of the reverse side thereof. Each of the leg members $T_2$ is pivotally connected to the lid body $T_1$ by attaching both ends of the substantially M-shaped leg member $T_2$ to regions adjacent two corner portions of the reverse side of the lid body $T_1$ through any suitable mounting means (not shown) for allowing the leg member $T_2$ to be collapsed, for example, a combination of brackets and pins, or hinge means. In the illustrated example, four damper means D are arranged at regions adjacent four corner portions of the reverse side of the lid body $T_1$. When the leg members $T_2$ are operatively collapsed after the cargo floor lid T is used as the table means, portions of one of the leg members $T_2$ are adapted to be abutted against elastic means (not shown) of two damper means D at points X in FIG. 2. Therefore, even if a shock is applied to the cargo floor lid T when the leg members $T_2$ are operatively collapsed, such shock can be absorbed by the elastic means of the damper means D. Further, even though a shock is applied to the cargo floor lid T and an edge of the opening of the storage portion where the cargo floor lid T is fitted in the opening of the storage portion, such shock can be positively absorbed by the elastic means of the damper means D.

Figure 3:
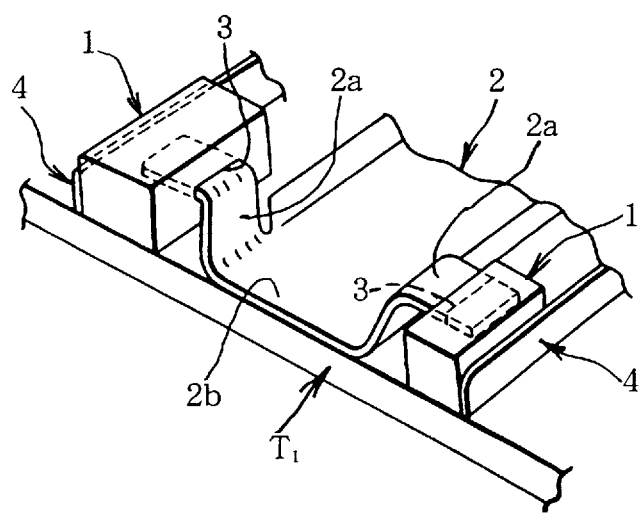
FIG. 3 is a schematic enlarged perspective view of one of the damper means shown in FIG. 2.

Referring to FIG. 3, there is illustrated one of the four damper means shown in FIG. 2. The damper means comprises elastic means for absorbing a shock which may be applied to the lid means, and support means for supporting the elastic means. In the illustrated example, the elastic means comprises a pair of elastic members 1. Each of the elastic members 1 is in the form of a block and formed of any suitable elastic material. In the illustrated embodiment, the elastic members are made of rubber. Each of the elastic members 1 has a slit 3 formed in a first side thereof and extending into the interior of the elastic member 1. The support means 2 includes two spaced apart projecting pieces 2a, each of which has a substantially inverted L-shape in cross-section and rises upwardly from the surface of the reverse side of the lid body $T_1$. In the illustrated example, the support means further includes an intermediate section 2b interconnecting the spaced apart projecting pieces 2a. The intermediate section 2b is attached onto the surface of the reverse side of the lid body $T_1$. Each of the elastic members 1 is supported on a corresponding one of the projecting pieces 2a by causing the elastic member 1 to be fitted onto a tip of the projecting piece 2a through the slit 3 of the elastic member 1. The damper means D according to the present invention further includes two receiving plates 4 mounted on the surface of the reverse side of the lid body $T_1$ and rising upwardly from the surface of the reverse side of the lid body $T_1$. Each of the receiving plates 4 serves as means to receive a corresponding one of the elastic members 1 supported to the projecting pieces 2a. More particularly, each of the receiving plates 4 is placed close to a second side of each of the elastic members 1, and is engaged with the second side of the elastic member 1. Thus, each of the elastic members 1 is elastically pressed against the corresponding receiving plate 4 and interposed between the corresponding projecting piece 2a and the corresponding receiving plate 4, so that the elastic member is securely supported with respect to the lid body $T_1$ through the support means 2 and receiving plate 4 without easily detaching from the lid body $T_1$. Incidentally, the receiving plates 4 can act as reinforcing ribs for the lid body $T_1$.

The terms and expressions which have been employed are used as terms of description and not of limitation, and there is no intention in the use of such terms and expression of excluding any equivalents of the features shown and described, or portions thereof, but it is recognized that various modifications are possible within the scope of the invention claimed.

What is claimed is:

1. Damper means for attachment to a shock-affected component, said damper means comprising:

elastic means for absorbing shock which may be applied to said shock-affected component;

said elastic means having first and second sides which are opposite to each other, and a slit formed in said first side of said elastic means and extending into the interior of said elastic means;

support means adapted to be mounted on said shock-affected component for supporting said elastic means;

said support means including projecting means inserted into the slit formed in said elastic means for supporting said elastic means on said support means; and receiving means adapted to be mounted on said shock-affected component for receiving said elastic means;

said receiving means being placed closely to said second side of said elastic means and elastically engaged with said second side of said elastic means, so that when said damper means is attached to said shock-affected component, said elastic means is securely retained on said shock-affect component through said support means and receiving means without easily detaching from said shock-affected component.

2. Damper means as defined in claim 1, wherein said shock-affected component comprises lid means for covering an opening in storage portion formed in a floor of an automotive vehicle for housing various articles.

3. Damper means as defined in claim 2, wherein said lid means includes a plate-like lid body and leg means pivotally connected to said plate-like lid body in a manner to be collapsed, whereby said lid means constitutes collapsible table means for outdoor use.

4. Damper means as defined in claim 3, wherein said leg means comprises a pair of leg members, each of which is formed to have a substantially M-shape in outline and pivotally connected to said plate-like lid body.

5. Damper means for attachment to a shock-affected component, said damper means comprising:

a pair of elastic members for absorbing shock which may be applied to said shock-affected component;

each of said elastic members having first and second sides which are opposite to each other and a slit formed in said first side and extending into the interior of the elastic member;

a support member for supporting said elastic members;

said support member comprising a pair of spaced apart projecting pieces and an intermediate section interconnecting said spaced apart projecting pieces;

each of said projecting pieces being formed to have a substantially inverted L-shape in cross-section;

said projecting pieces being inserted into the slits formed in the first sides of said elastic members for supporting said elastic member;

said intermediate section being adapted to be mounted on said shock-affected component; and a pair of receiving plates adapted to be mounted on said shock-affected component in close proximity to the second sides of said elastic members and elastically engaged with said second sides of said elastic members, so that when said damper means is attached to said shock-affected component, said elastic members are securely retained on said shock-affected component through said support member and receiving plates without easily detaching from said shock-affected component.

6. Damper means as defined in claim 5, wherein said shock-affected component comprises lid means for covering an opening in a storage portion formed in a floor of an automotive vehicle for housing various articles.

7. Damper means as defined in claim 6, wherein said lid means comprises a plate-like lid body and a pair of leg members pivotally connected to said plate-like lid body in a manner to be collapsed, whereby said lid means constitutes collapsible table means for outdoor use.

8. A lid for covering an opening in a storage portion formed in a floor of an automotive vehicle for housing various articles, said lid means comprising:

a substantially plate-like body;

elastic means for absorbing shock which may be applied to said plate-like body;

said elastic means having first and second sides which are opposite to each other, and a slit formed in said first side of said elastic means and extending into the interior of said elastic means;

support means mounted on a reverse side of said plate-like body for supporting said elastic means;

said support means including projecting means inserted into the slit formed in said elastic means for supporting said elastic means on said support means;

receiving means mounted on said reverse side of said plate-like body for receiving said elastic means;

said receiving means being placed in close proximity to said second side of said elastic means and elastically engaged with said second side of said elastic means, so that said elastic means is securely retained on said plate-like body through said support means and receiving means without easily detaching from said plate-like body.

9. A lid as defined in claim 8 comprising a pair of leg members, each of which is pivotally connected to said plate-like body in a manner to be collapsed, whereby said lid constitutes collapsible table means for outdoor use.

* * * * *